United States Patent [19]

Mahling

[11] Patent Number: 5,591,283
[45] Date of Patent: Jan. 7, 1997

[54] PNEUMATIC TIRE FOR BICYCLES WITH TIRE PADDING STRIPS

[75] Inventor: Rolf Mahling, Korbach, Germany

[73] Assignee: Continental Aktiengesellschaft, Hanover, Germany

[21] Appl. No.: 408,607

[22] Filed: Mar. 21, 1995

[30]  Foreign Application Priority Data

Aug. 8, 1994 [DE]  Germany ........................... 44 27 894.2

[51] Int. Cl.[6] .............. B60C 5/02; B60C 15/00; B60C 15/06; B60C 19/12
[52] U.S. Cl. ............ 152/501; 152/539; 152/546; 152/547; 152/549
[58] Field of Search ................... 152/501, 522, 152/511–512, 195–197, 517, 549, 546–547, 539

[56]  References Cited

U.S. PATENT DOCUMENTS

| | | | |
|---|---|---|---|
| 1,014,464 | 1/1912 | Hall ........................................ | 152/512 |
| 1,154,848 | 9/1915 | Dew et al. ............................ | 152/512 X |
| 1,432,483 | 10/1922 | Michelin .............................. | 152/501 |

FOREIGN PATENT DOCUMENTS

| | | | |
|---|---|---|---|
| 2231659 | 1/1973 | Germany ............................. | 152/511 |
| 2528218 | 1/1977 | Germany . | |
| 69004603 | 1/1990 | Germany . | |

*Primary Examiner*—Adrienne C. Johnstone
*Attorney, Agent, or Firm*—Robert W. Becker & Associates

[57]  ABSTRACT

A pneumatic bicycle tire to be operated with an inner tube includes a tread and two sidewalls. A bead is connected to a free end of each one of the sidewalls for mounting the tire on a wheel rim with rim flanges having a maximum standard height limit. Each bead has a bead core. A carcass is embedded in the tire and extends between the beads, wherein free ends of the carcass are wound about the beads. The carcass includes at least one ply. A padding strip is embedded in each sidewall in the vicinity of the beads. The padding strip is positioned along a curved section of the sidewall. The curved section begins at a center of the bead core and has a length equal to 40% to 210% of the maximum standard height limit. The padding strip has a hardness of between 40 and 60 Shore A, a rebound resilience of below 80% measured at a frequency of 2,000 Hz, and a thickness of at least 0.6 mm.

15 Claims, 3 Drawing Sheets

5,591,283

PNEUMATIC TIRE FOR BICYCLES WITH TIRE PADDING STRIPS

BACKGROUND OF THE INVENTION

The invention relates to a pneumatic tire for bicycles to be operated with an inner tube, the tire having two beads for mounting the tire on a wheel rim with rim flanges of a maximum rim flange height according to ETRTO (European Tire and Rim Trading Organization) whereby the beads have arranged therein bead cores about which a one-ply or multi-ply carcass is wound.

Especially in so-called downhill races performed with all-terrain bicycles (mountain bikes) where on downhill slopes of a great down gradient top speeds of approximately 80 km/h are reached and jumps of multiple meters are performed, it occurs, especially when the tire contact surface under extreme load is positioned on a stick or a stone, that the tire despite its great volume is compressed such that the area of the inner tube wall adjacent to the shoulder contacts the inner tube wall in the vicinity of the bead and that the inner tube thereafter experiences failure. In general, a sudden air pressure loss occurs which results in loss of maneuvering control. As a solution German Document 690 04 603 has suggested a reinforcement of the inner tube.

FIG. 1 shows in portion a known wheel for mountain bikes in cross-section of a tire 1 with inner tube 2 on a wheel rim 7. In a conventional manner the non-hose shaped tire 1 radially inwardly ends in beads 3 in which is contained a bead core 4. The center of the cross-section of the bead core 4 is indicated by reference numeral 5. About the bead cores 4 a carcass 6 is wound in a manner known per se. The anchoring of the tire 1 at the wheel rim 7 takes place, as conventional with non-hose-shaped tires, between the tire beads 3 and the rim flanges 8 in cooperation with the air pressure held by the inner tube 2. Especially for sporting applications the shown hook-shaped design of the rim flanges is widely accepted which exhibits an especially favorable ratio between construction weight and secure seating in combination with good centering properties.

FIG. 2 shows the development of the aforementioned damage in cross-section: the same wheel momentarily drives across a bump-like obstacle 13 which can be considered to be essentially stiff with respect to the stiffness of the components forming the tire equipment. In the circular areas 14 indicated in dash-dotted lines the areas of the inner tube 2 in the vicinity of the bead collide with the areas of the inner tube 2 in the vicinity of the tire shoulder. This results in considerable pressing forces between the obstacle 13 and the rim flanges 8. Due to these pressing forces the relatively soft material, conventionally a vulcanized product of a butyl rubber mixture, of the inner tube flows laterally so that the wall thickness of the inner tube at these locations is greatly reduced, during great impacts practically to zero. After overcoming the obstacle 13 upon reextension of the tire 1 a masticating movement occurs inevitably which results in failure of the inner tube at the four predamaged locations.

When the aforedescribed damage has occurred, the inner tube has four individual damaged areas arranged in a rectangle relative to one another for which reason this damage is known in the art as a snake bite.

In principle, such a damage can of course be avoided by selecting a lower speed or a different course. However, this is unacceptable to the customer, respectively, and to the race event management.

The problem could further be reduced by lowering the weight of the machine which however, in view of the high stability requirements and the minimal contribution to the total weight (weight of the rider plus bicycle), does not promise to be successful. The driver's weight is also not at one's disposal.

Furthermore, it is known to improve the energy absorption for absorbing a shock with a spring wheel suspension; however, this increases the machine weight and the handling is compromised. Furthermore, it has been tried to increase the travel of the spring by using curved instead of straight spokes between the wheel rim and the hub, especially at the front wheel. However, this impairs the fatigue resistance of the spokes and the directional stability.

Furthermore, the energy absorption can be increased by increasing the tire pressure. As a function of the softness of the ground an optimal tire pressure is selected with respect to the rolling resistance and the coefficient of friction which, depending on the ground and its moisture contents, is relatively low, i.e.; in an area between approximately 2.5 and 4.0 bar. In view of these counteracting aspects an increase of the tire pressure is hardly possible.

Physically similar problems as with mountain bikes also are present for street racing bikes despite the conventionally higher tire pressure in a range between 6 and 10 bar. This relates to the substantially smaller desired tire height which reduces the amount of rubber to be masticated and thus reduces the rolling resistance and furthermore allows for a smaller tire width which reduces the dominating air resistance effect. Due to the small tire cross-section and top speeds up to 100 km/h, pot holes however can result in a snake bite damage.

It is an object of the invention to reduce the probability of a snake bite damage without substantially increasing the rolling resistance and the weight.

SUMMARY OF THE INVENTION

This object is inventively solved by providing a padding strip (9) within the tire (1) in the vicinity of both beads (3) within a curved section (12) to be measured along the carcass beginning at the center (5) of the bead core (4) which extends from 40% to 210%, preferably only from 50% to 170%, of the maximum rim flange height for the corresponding tire size according to ETRTO, the padding strip having a hardness between 40 and 60 Shore A, a rebound resilience below 80% measured at a frequency of 2,000 Hz and a thickness (d) of at least 0.6 mm. This is based on the idea to increase the possible energy absorption in the tire after forcing away the air buffer and thus to decrease the deformation energy which is suddenly introduced into the inner tube.

The pneumatic bicycle tire to be operated with an inner tube according to the present invention is primarily characterized by:

a tread and two sidewalls;

a bead connected to a free end of each one of the sidewalls for mounting the tire on a wheel rim with rim flanges having a maximum height limit according to ETRTO;

each one of the beads having a bead core;

a carcass embedded in the tire and extending between the beads, wherein free ends of the carcass are wound about the beads, the carcass comprising at least one ply;

a padding strip embedded in each one of the sidewalls in the vicinity of the beads;

the padding strip positioned along a curved section of the sidewall, the curved section beginning at a center of the bead core and having a length equal to 40% to 210% of the maximum height limit according to ETRTO; and the padding strip having a hardness of between 40 and 60 Shore A, a rebound resilience of below 80% measured at a frequency of 2,000 Hz and a thickness of at least 0.6 mm.

Advantageously, the length is equal to 50% to 170% of the maximum height limit according to ETRTO.

Preferably, the padding strip is located axially inwardly relative to the carcass with respect to an axis of the tire and has a maximum thickness of 1.2 to 3.5 mm.

Expediently, the carcass comprises two of the plies at least in the vicinity of the beads, wherein the padding strip is located between the carcass plies and has a maximum thickness of 1.2 to 2.5 mm.

Preferably, the padding strip has a hardness of 42 to 52 Shore A. The rebound resilience of the padding strip, measured at a frequency of 2,000 Hz, is preferably between 35% and 70%. Preferably, a product of the maximum thickness of the padding strip in millimeters and the hardness in Shore A is between 80 and 160.

The padding strip has advantageously a greatest thickness in an area where upon compression of the tire under load the portion of the inner tube located close to the bead first contacts the portion of the inner tube located close to the tire tread.

The padding strip has preferably a greatest thickness within an area of the curved section spaced from the center of the bead core by a distance of 0.53 to 1.25 of the maximum height limit according to ETRTO.

The present invention further relates to a tire equipment for a bicycle. The tire equipment is primarily characterized by a tire and an inner tube positioned in the tire wherein the tire comprises: a) a tread and two sidewalls; b) a bead connected to a free end of each one of the sidewalls for mounting the tire on a wheel rim with rim flanges having a maximum height limit according to ETRTO; each one of the beads having a bead core; c) a carcass embedded in the tire and extending between the beads, wherein free ends of the carcass are wound about the beads, the carcass comprising at least one ply; d) a padding strip embedded in each one of the sidewalls in the vicinity of the beads; e) the padding strip positioned along a curved section of the sidewall, the curved section beginning at a center of the bead core and having a length equal to 40% to 210% of the maximum height limit according to ETRTO; f) the padding strip having a hardness of between 40 and 60 Shore A, a rebound resilience of below 80% measured at a frequency of 2,000 Hz and a thickness of at least 0.6 mm; and wherein the padding strip has a hardness that is at most as hard as a rubber coating of the carcass and at most harder by 3 units of Shore A hardness than the inner tube.

The hardness of the padding strip is preferably lower than the hardness of the inner tube.

The inner tube has a wall thickness and a product of the maximum thickness of the padding strip in millimeters and the Shore A hardness of the padding strip is greater than the product of the wall thickness of the inner tube in millimeters and the Shore A hardness of the inner tube.

The product of the maximum thickness of the padding strip in millimeters and the Shore A hardness of the padding strip is preferably between 80 and 160.

The ratio between the energy to be absorbed by the inventive padding rings and the additional weight which has to be taken into consideration, is most favorable when the padding strips 9 are arranged on the axially inner side (10) of the carcass (6). This is shown in FIG. 4.

The ratio between the energy to be absorbed by the inventive padding rings and the additional rolling resistance to be taken into consideration is most favorable when the padding strips (9) in a tire with conventional carcass construction with two carcass plies (6) at least in the vicinity of the bead is arranged between the carcass plies (6). In this area the padding strip is exposed to the smallest amount of mastication during impact-free rolling of the tire. This is shown in FIG. 3.

The padding ring can be made visible to the customer for an axially inner arrangement with a different color at the tire side wall.

Preferably, the inventive padding strip (9) has a hardness between 42 and 52 Shore A. It is thus relatively soft, i.e., substantially softer than the known rim flange protective strips.

In the most effective variant for impact absorption, i.e., an arrangement of the padding strips axially inwardly, a dimension of the maximum thickness (d) of the padding strip (9) between 1.2 and 3.5 mm is preferred, especially between 2.2 and 3.0 mm. In this arrangement the padding strip can be made especially thick because the cooperation between the rim flange and the exterior side of the tire bead, which is especially important for steering precision, is not affected.

When arranging the padding strips between carcass plies (conventionally in a bicycle tire construction two carcass plies are located in the vicinity of the bead) only a small effect on the steering precision is observed. However, this does not appear to be disadvantageous as long as the thickness of the padding strip is not more than 2.5 mm. Especially preferred in this embedding position of the padding strip is a thickness between 1.8 and 2.5 mm. With respect to dimensioning the rebound resilience of the inventive padding strip the following conflicting goals must be considered:

The desired energy-absorbing effect for protecting the inner tube is greater for a greater Shore hardness in combination with smaller rebound resilience, i.e., greater plasticity. On the other hand, for a smaller rebound resilience the rolling resistance increases. In complicated measurements the optimum compromise has been found in which the fact has been taking into consideration that with an increasing energy absorption of the inventive padding strip the tire pressure increase relative to the tire pressure for the lowest rolling resistance can be lowered. Preferably, the rebound resilience of the padding strips (9), measured at a frequency of 2,000 Hz, is below 80%, preferably between 35% and 70%. When arranging the padding strips between the carcass plies, the range between 35% and 55% is especially preferred and for the axially inward arrangement the range is between 45% and 65%.

Expediently, the padding strip of the pneumatic tire is less hard or equally hard as the rubber coating of the carcass and is at most 3 units of Shore A hardness harder than the inner tube. It is especially preferred that the hardness of the padding strips of the pneumatic tire is less than the hardness of the inner tube. With this measure, the entire deformation absorbed by the tire equipment is concentrated on the inventive padding strip instead of by the inner tube due to the stiffness ratios (inner tube mixture is softer than the carcass rubber coating). Accordingly, the reduction of the inner tube wall thickness after impact is reduced.

While the aforementioned prior art measures are directed to reduce the probability of a snake bite damage caused by complete tire compression upon impact by absorbing more impact energy external to the tire equipment (for example, in the wheel suspension or within the wheel) or by increasing the tire pressure and thus absorbing impact energy in the street surface or within the air buffer of the tire equipment, the present invention is directed to reduce the effect of a snake bite inner tube damage so that leaks are caused with substantially reduced frequency for an essentially identical probability of essentially unchanged complete tire compression upon impact.

A special advantage of the invention is that with respect to conventional tires only an extra weight of 60 grams results. Other measures, on the other hand, for example, increasing the thickness of the tire and inner tube, would result in several times more extra weight.

Thickness, plasticity, and hardness determine essentially (in addition to the correct measurements of the width) the magnitude of the possible energy absorption within the inventive padding strip. Another important factor is the distribution of the energy to be absorbed between the components tire tread, tire carcass, inventive padding strip, and inner tube. For an advantageous distribution of the impact energy to be absorbed it is expedient that the product of the maximum thickness (d) of the padding strip (9) in millimeters and its hardness in Shore A is greater than the product of the wall thickness (s) of the inner tube in millimeters and its hardness in Shore A whereby preferably the product of the maximum thickness (d) of the padding strip (9) in millimeters and its hardness in Shore A is between 80 and 160.

The ratio between the additional weight resulting from the inventive padding strips and the magnitude of the possible energy absorption and thus its protective effect is especially low and thus especially favorable when the padding strips are thickest where during compression upon impact the inner tube wall in the area of the beads first contacts the inner wall within the area of the tread. This area, for tires and wheel rims corresponding to the presently valid ETRTO standards (European Tire and Rim Trading Organization), beginning at the bead core center is positioned at 0.56 to 1.1 times of the maximum allowed height of the rim flange according to ETRTO. Preferably, in the area of the greatest thickness there is arranged not only a peak but also a plateau of constant thickness because there are unknown factors not only with respect to the actual wheel rim used by the customer but also with respect to the impact of an obstacle on the tire. Such a plateau of greatest thickness extends expediently from 0.53 to 1.25 times the maximum rim flange height allowed according to ETRTO for the corresponding tire.

BRIEF DESCRIPTION OF THE DRAWINGS

The invention in the following will be explained in more detail with some figures. It is shown in.

DESCRIPTION OF PREFERRED EMBODIMENTS

Figure 1:
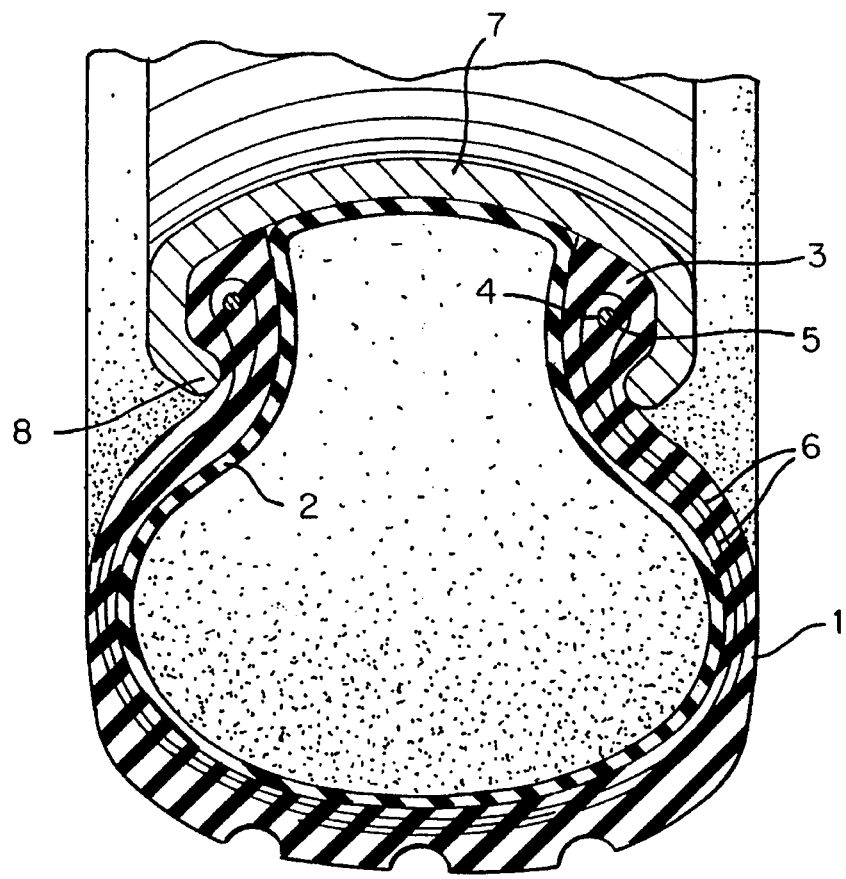
FIG. 1 a portion of a cross-section of a vehicle wheel with a prior art tire for mountain bikes.
Figure 2:
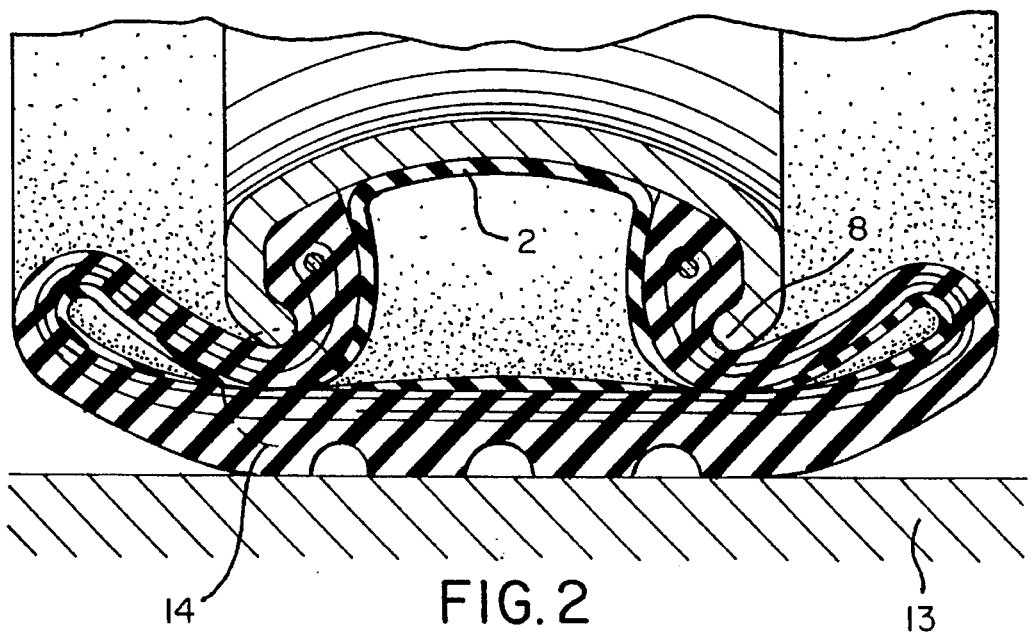
FIG. 2 a portion of a cross-section of a vehicle wheel with a prior art tire for mountain bikes as shown in FIG. 1 in the compressed state.
Figure 3:
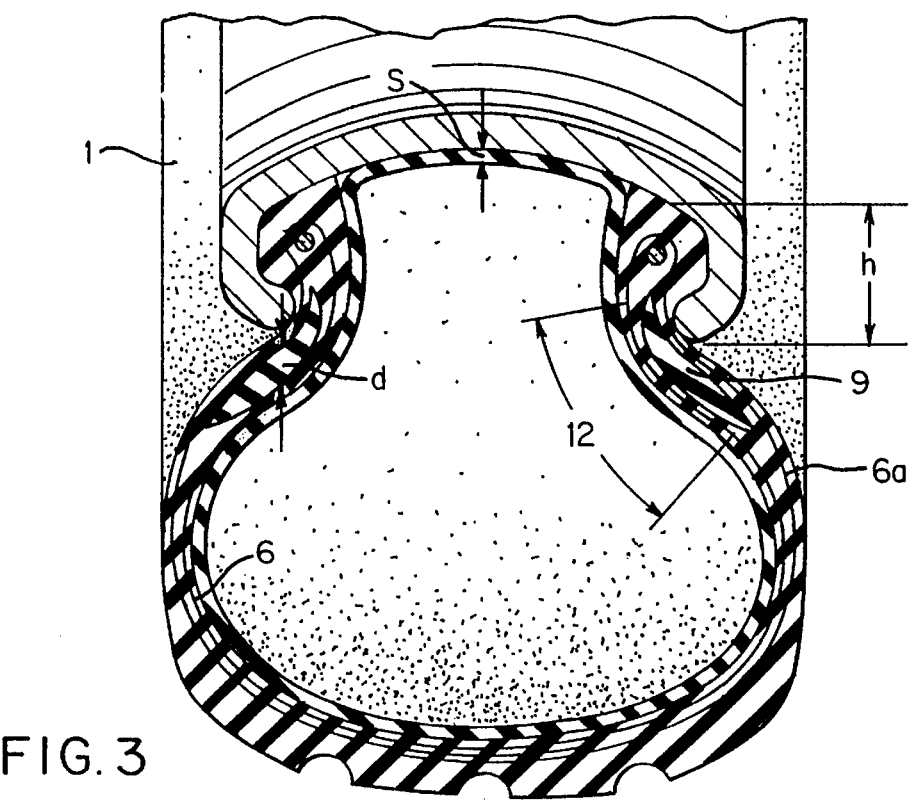
FIG. 3 a portion of a cross-section of a vehicle wheel with an inventive tire with a padding strip between the carcass layers, FIG. 4 a portion of a cross-section of a vehicle tire with the inventive tire having a padding strip on the axially inner side of the tire, FIG. 5a a portion of a cross-section of a vehicle wheel with an inventive tire with a padding strip on the axially inner side of the tire as shown in FIG. 4, but compressed to such an extent that a contact between the areas of the inner tube occurs, and FIG. 5b the same portion of a cross-section as in FIG. 5a of a vehicle wheel with an inventive tire with padding strip on the axially inner side of the tire as in FIG. 4 but further compressed so that the inventive padding strip performs its function.

FIG. 3 shows a portion of a cross-section of a vehicle wheel with the inventive tire 1 with a padding strip 9 between the carcass plies 6. This arrangement of the padding strips 9 results in a reduced, i.e., substantially no, increase of the rolling resistance as the previously shown variant and allows a thicker dimensioning of the padding strips 9 because the axially outer carcass ply 6a maintains its conventional curvature. This also contributes to the buffering effect.

Figure 4:
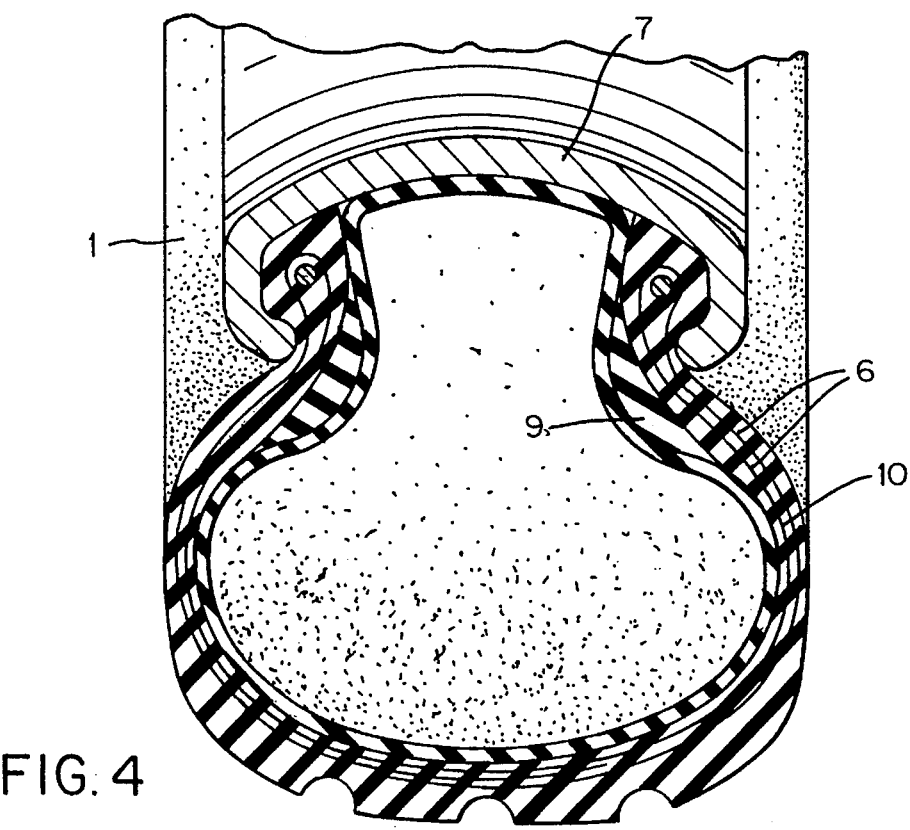

FIG. 4 shows a portion of a cross-section of a vehicle wheel with an inventive tire 1 with a padding strip 9 on the axially inner side 10 of the carcass 6 of the tire. This arrangement allows for the thickest dimensioning of the inventive padding strip 9 and the greatest possible impact energy absorbing effect without a measurable effect on the steering properties and secure seating.

In FIG. 3 the curved section 12 of the carcass 6 in the vicinity of the beads 3 in which the inventive padding strip 9 should be positioned is marked, in particular between 50 and 170% of the maximum standard rim flange height h (also shown in the drawing).

According to the standards of ETRTO the rim flange height h is defined as the height which is to be measured from 1 millimeter axially inwardly with respect to the inner wall of the rim flange from the bead seat to the radially external point of the rim flange 8. This is shown in FIG. 3.

Figure 5A:
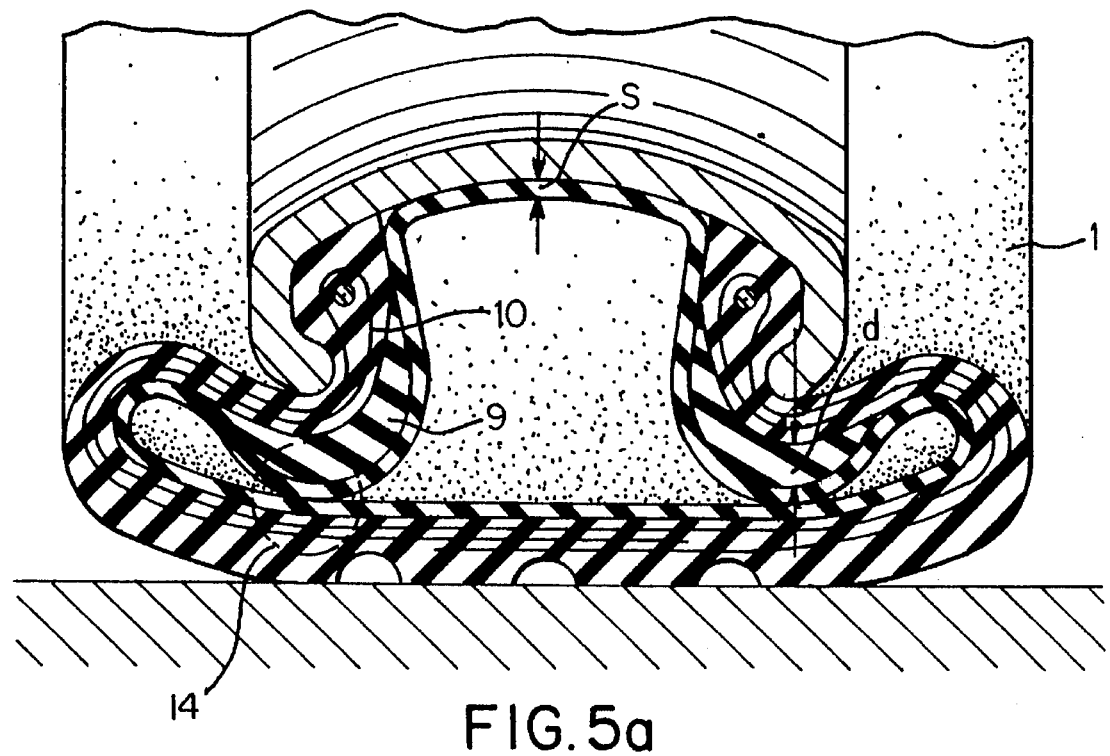

The greatest thickness of the inventive padding ring 9 is indicated in FIGS. 3 and 5a with reference letter d and the wall thickness of the inner tube is indicated by reference letter s.

Due to the most pronounced effect with respect to preventing snake bite damage to inner tires, most experimental measurements have been performed with tires of the last mentioned variant. The speed limit was determined at which the passing of a bump-shaped obstacle on an otherwise planar surface resulted in damage to the inner tube, which maximum speed will be called in the following failure speed. The obstacle was a steel bar fastened perpendicular to the surface of the street and projecting from the street surface by 60 mm and having a width of 10 mm and a radius of curvature in the direction of travel of 5 mm. The experiments were performed with a driver having a weight 92 kg on a mountain bike weighing 15 kg with 26 inch wheels and a 1.9 tire equipment (tire width 47 mm) including a butyl inner tube of a 1.0 mm thickness.

Due to safety considerations, i.e., in order to keep the failure speed within non-dangerous magnitudes, a multitude of experiments were carried out with a tire pressure of 1 bar over atmospheric pressure. Thus, already with weak impulses, i.e., smaller velocities, the collision of the inner tube walls was achieved. As an average of a plurality of measurements, the failure speed of an inner tube within a conventional tire was 36 km/h. For an inventive tire with an axial inner arrangement of the padding strips, as shown in FIG. 4, and with a maximum thickness of the padding strip of 3 mm, for the same tire pressure a distribution of the failure speed between 53 and 66 km/h and an average of approximately 57 km/h was measured.

These experiments are evidence of a significant increase of the protection against snake bite damage. At higher tire pressures substantially higher failure speeds can be achieved.

FIG. 5a shows a portion of a cross-section of a vehicle wheel with an inventive tire 1 with a padding strip 9 on the axially inner side 10 of the tire 1 as shown in FIG. 4, but compressed to such an extent that the inner tube wall areas barely contact one another. In order to facilitate the drawing only on the right side a thick dash-dotted line indicates the collision area 14 with a circle. The figure shows that for the inventive tire 1 already for a small compression the inner tube walls collide because the travel of spring provided by the air buffer is reduced by the thickness d of the padding strip 9 within the collision area 14. However, upon increasing the impact energy the resulting pressing force increase is more flat than with conventional tires so that the sensitive inner tube is protected.

Figure 5B:
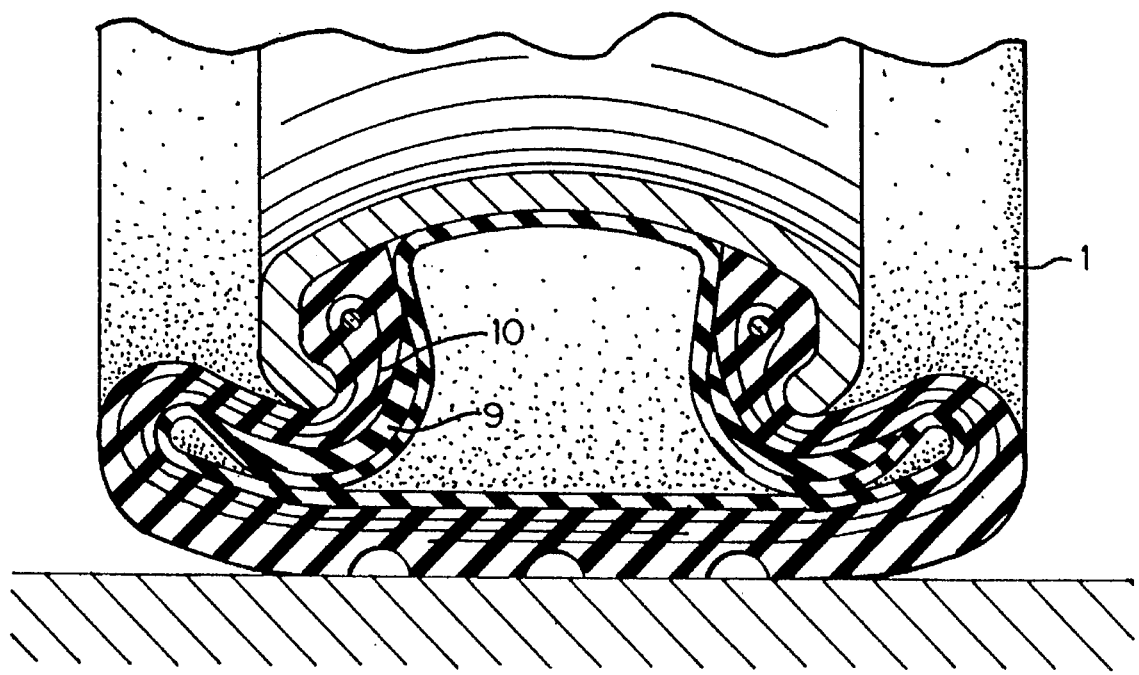

This is illustrated in FIG. 5b which shows the same portion of the cross-section as FIG. 5a of a vehicle tire with the inventive tire 1 with padding strips 9 on the axially inner side 10 of the tire 1 as shown in FIG. 4, but further compressed whereby the inventive padding strips 9 perform their function, i.e., they are visibly flattened.

The present invention is, of course, in no way restricted to the specific disclosure of the specification and drawings, but also encompasses any modifications within the scope of the appended claims.

What I claim is:

1. A pneumatic bicycle tire to be operated with an inner tube, said tire comprising:

a tread and two sidewalls;

a bead connected to a free end of each one of said sidewalls for mounting said tire on a wheel rim with rim flanges having a maximum standard height limit;

each one of said beads having a bead core;

a carcass embedded in said tire and extending between said beads, wherein free ends of said carcass are wound about said beads, said carcass comprising at least one carcass ply;

a padding strip embedded in each one of said sidewalls in the vicinity of said beads;

said padding strip positioned along a curved section of said sidewall, said curved section beginning at a center of said bead core and having a length equal to 40% to 210% of said maximum standard height limit; and said padding strip having a hardness of between 40 and 60 Shore A, a rebound resilience of below 80% measured at a frequency of 2,000 Hz and a thickness of at least 0.6 mm.

2. A pneumatic bicycle tire according to claim 1, wherein said length is equal to 50% to 170% of said maximum standard height limit.

3. A pneumatic bicycle tire according to claim 1, wherein said padding strip is located axially inwardly relative to said carcass with respect to an axis of said tire.

4. A pneumatic bicycle tire according to claim 3, wherein said padding strip has a maximum thickness of 1.2 to 3.5 mm.

5. A pneumatic bicycle tire according to claim 1, wherein said carcass comprises two carcass plies at least in the vicinity of said beads, wherein said padding strip is located between said two carcass plies.

6. A pneumatic bicycle tire according to claim 5, wherein said padding strip has a maximum thickness of 1.2 to 2.5 mm.

7. A pneumatic bicycle tire according to claim 1, wherein said padding strip has a hardness of 42 to 52 Shore A.

8. A pneumatic bicycle tire according to claim 1, wherein said rebound resilience of said padding strip, measured at a frequency of 2,000 Hz, is between 35% and 70%.

9. A pneumatic bicycle tire according to claim 1, wherein a product of a maximum thickness of said padding strip in millimeters and said hardness in Shore A is between 80 and 160.

10. A pneumatic bicycle tire according to claim 1, wherein said padding strip has a greatest thickness in an area where upon compression of said tire under load the portion of the inner tube located close to said bead first contacts the portion of the inner tube located close to said tire tread.

11. A pneumatic bicycle tire according to claim 1, wherein said padding strip has a greatest thickness within an area of said curved section spaced from said center of said bead core by a distance of 0.53 to 1.25 of said maximum standard height limit.

12. A tire equipment for a bicycle, said tire equipment comprising a tire and an inner tube positioned in said tire wherein said tire comprises:

a) a tread and two sidewalls;

b) a bead connected to a free end of each one of said sidewalls for mounting said tire on a wheel rim with rim flanges having a maximum standard height limit; each one of said beads having a bead core;

c) a carcass embedded in said tire and extending between said beads, wherein free ends of said carcass are wound about said beads, said carcass comprising at least one carcass ply;

d) a padding strip embedded in each one of said sidewalls in the vicinity of said beads;

e) said padding strip positioned along a curved section of said sidewall, said curved section beginning at a center of said bead core and having a length equal to 40% to 210% of said maximum standard height limit;

f) said padding strip having a hardness of between 40 and 60 Shore A, a rebound resilience of below 80% measured at a frequency of 2,000 Hz and a thickness of at least 0.6 mm; and wherein said padding strip has a hardness that is at most as hard as a rubber coating of said carcass and at most harder by 3 units of Shore A hardness than said inner tube.

13. A tire equipment according to claim 12, wherein the hardness of said padding strip is lower than the hardness of said inner tube.

14. A tire equipment according to claim 12, wherein:

said inner tube has a wall thickness; and a product of a maximum thickness of said padding strip in millimeters and the Shore A hardness of said padding strip is greater than the product of said wall thickness of said inner tube in millimeters and the Shore A hardness of said inner tube.

15. A tire equipment according to claim 14, wherein said product of a maximum thickness of said padding strip in millimeters and the Shore A hardness of said padding strip is between 80 and 160.

* * * * *